United States Patent
Rasmussen et al.

[11] Patent Number: 6,129,049
[45] Date of Patent: Oct. 10, 2000

[54] FEEDING DEVICE

[75] Inventors: Hans Rasmussen, Nykoebing Sjaelland, Denmark; Helena E. E. Petersen, 2389 Route 202 Dunham, QC, Canada, J0E 1M0

[73] Assignee: Helena E. E. Petersen, Dunham, Canada

[21] Appl. No.: 09/170,218

[22] Filed: Oct. 13, 1998

[51] Int. Cl.[7] .................................................. A01K 61/02
[52] U.S. Cl. .......................................................... 119/52.1
[58] Field of Search .................................. 119/52.1, 52.4, 119/53, 53.5, 54, 56.1

[56] References Cited

U.S. PATENT DOCUMENTS

| | | | |
|---|---|---|---|
| 484,442 | 10/1892 | Magoon | 119/52.1 |
| 2,525,385 | 10/1950 | Uhrenholdt | 119/52.1 |
| 5,243,930 | 9/1993 | Rahm | 119/54 |
| 5,263,437 | 11/1993 | Murphrey | 119/53.5 |
| 5,447,119 | 9/1995 | Rasmussen | 119/51.5 |
| 5,850,805 | 12/1998 | Kleinsasser | 119/54 |

FOREIGN PATENT DOCUMENTS

| | | |
|---|---|---|
| 2843153 | 4/1979 | Germany . |
| 1002056 | 11/1996 | Netherlands . |

*Primary Examiner*—Thomas Price
*Attorney, Agent, or Firm*—Watson Cole Grindle Watson, P.L.L.C.

[57] ABSTRACT

A feeding device for feeding young pigs comprises a feeding tube (16), which may be a flexibly yielding or a rigid feeding tube. The feeding tube (16) is connected with a feed reservoir (26) and is fastened to a frame (15). The lower end (17) of the feeding tube (16) is arranged at a short distance over a feeding plate (12). Arranged around the lower end of the tube is a ring (1). The ring (1) may be manipulated by young pigs, which have a size between 5 and 13 kg, so that these animals are able to be fed by the feeding device. The feeding device will make it possible in a technically simple manner to feed young pigs.

4 Claims, 4 Drawing Sheets

FEEDING DEVICE

BACKGROUND OF THE INVENTION

1. Field of the Invention

The present invention relates to a feeding device for use in feeding animals, preferably young pigs, and comprising a basis designed as a feeding plate, a frame fastened to the basis and supporting a tube, which is connected at its upper end to a feed reservoir and the lower part of which is arranged at a short distance over the feeding plate and in combination with the latter delimits an annular feed discharge opening having a height corresponding to the distance of the tube over the feeding plate, said tube being optionally mounted rigidly or movably on the frame.

The feeding device is particularly intended for use in feeding weaned young pigs having a weight of between 5 and 13 kg.

2. The Prior Art

Various feeding devices are known for feeding animals, particularly pigs. They have proven to be valuable in practice and have seen a great commercial success. The known feeding device is disclosed U.S. Pat. No. 5,447,119.

The known feeding device is based on the use of an elastically flexible feeding tube. Due to its elastic flexibility, the animals are able to apply their snouts to cause a strong movement in the transverse direction of the tube so that feed flows out of the opening of the tube and comes to lay on the feeding plate. The elastic yieldingness will bring the tube back into its normal starting position when the animal does not activate the tube. The tube is suspended so that in itself it is able to perform a slight pendular movement. These slight pendular movements will be very limited since, otherwise, there is a risk of free flow of fed and consequently a risk of feed waste.

The known feeding device has lead a very great success in feeding pigs. It has turned out, however, that it is difficult to obtain quite satisfactory results with the feeding device for little pigs having a weight from 5 to 13 kg. It has turned out that these little pigs do not possess sufficient strength in their snouts to give the available flexible tubes a sufficient yielding bend allowing a discharge of feed.

Although the tube may have a rather great length and consequently a fairly good chance of an elastically yielding bend, a feeding device having a shorter feeding tube will often be used for feeding young pigs, the reservoir being formed in the shape of a funnel-shaped container. In such a feeding device the length of the tube will be relatively short. Therefore, it will be difficult to obtain a sufficient flexibility for the feeding device to be suited for feeding young pigs.

Consequently, there has been a desire to raise the feeding tube over the feeding plate so that the height of the feed discharge opening is sufficient for the feed to flow unto the feeding plate by itself. However, this results in waste since the feed flows beyond the lateral edge of the feeding plate and down into the water trough from where the piglets are unable to eat it.

The present invention may also be used in combination with other types of feeding devices in which the feeding tube is a rigid tube which is either retained or which just has a possibility of slight pendular swings. In this situation the present invention will function as an alternative to other types of dosing arrangements of different mechanical structures. Such mechanical dosing arrangements are generally complicated and may frequently cause operation stoppages. Furthermore, the mechanical dosing arrangements will require a strong actuation. The strength in the snouts of young pigs has consequently turned out to be insufficient for such mechanical arrangements.

Thus, it is the object of the present invention to establish a new technically simple feeding device which may be used in combination with existing feeding devices and, thereby, extend their field of use into an efficient feeding of small animals, preferably young pigs.

SUMMARY OF THE INVENTION

According to the present invention this is obtained by a feeding device wherein members for limiting the feed discharge over the area of the feeding plate are provided on the feeding plate at the discharge end of the tube, said limiting members being provided with a larger height than the height of the feed discharge opening so that feed cannot flow beyond the limiting members.

The limiting members will ensure that no feed flows off the feeding plate since the surface of the limiting members is in a horizontal plane above a plane containing the underside of the tube. It has turned out surprisingly that weaned piglets have a very rapid growth when fed by a feeding device according to the invention.

The limiting members may be provided in the form of a loose ring, which is placed loosely around the lower end of the tube, said ring being placed on the feeding plate, and wherein the ring has a larger inner diameter than the outer diameter of the tube.

The provision of a loose ring is a technically simple solution. The loose ring may be placed around flexible feeding tubes or rigid feeding tubes. Since the ring has a larger inner diameter than the outer diameter of the tube, it will be placed loosely around the tube, and the piglets may displace the ring around the tube. As the ring has a larger height than the feed discharge opening, which is defined between the feeding plate and the lower end of the feeding tube, feed will flow out and become positioned in the annular space formed between the tube and the ring. Furthermore, the piglets will not be able to remove the ring from its position around the tube.

The use of the loose ring, which has an adequate weight, makes it possible for the piglets to bring a small amount of feed out onto the feeding plate outside the ring. The piglets have sufficient snout strength to lift and move the ring so that feed flows out onto the feeding plate. As the piglets are eating, they will simultaneously push the ring in order to obtain more feed. The strength applied will move the ring so that an area of the feeding plate is covered with feed flowing out under the ring.

It has further turned out that the movement back and forth of the ring is sufficient to prevent blockages and clotting of feed in the tube. This makes the feeding device particularly suited for use in combination with animal feed used for young pigs in the form of ground grain, ground mixtures or pills in which fat in a molten condition has been absorbed.

The feeding device may be of a type having a substantially rectangular feeding plate, which is delimited at two opposite sides by a lateral wall extending upwardly over the feeding plate. In such an embodiment the limiting members may be provided in the form of two limiting plates, which are mounted between the two opposite lateral walls on either side of the feed discharge opening and which have end members having a shape that is adapted to the shape of the lateral walls, said limiting plates being fastened to the feeding device. The limiting plates will make it possible to delimit a desired area of the feeding plate where feed is able to flow out freely.

Once the feed has flown out onto the feeding plate, the young pigs will have the same eating pattern as older animals and, therefore, will eat the dry feed positioned on the feeding plate.

It will also be possible to design a feeding device according to the invention with a combination of the loose ring and the limiting plates.

The feeding device is very efficient in use. When the piglets have grown to a size such that they will be able to move an elastically yielding feeding tube in a manner as discussed above, it will be possible to remove the ring and/or the limiting plates whereafter the animals are fed according to the principles described in relation to the known feeding device having an elastically flexible feeding tube. The larger animals may thus push the feeding tube to give it an elastically yielding swing, whereby a larger amount of feed may be distributed on a larger area of the feeding plate.

This means that the need to adjust the feeding apparatus to the grown-up animals being fed is reduced considerably or entirely eliminated. The only adjustment that may be needed is a dismounting of the ring. Furthermore, the older animals may have a feeding pattern with a combination of dry feed and wet feed as a result of feed being pushed into the water trough.

The feeding device may be designed with each limiting plate fastened to a part of the frame by means of a connecting plate extending upwardly from the limiting plate and on either side of the connecting plate there may be provided barrier brackets covering spaces between the feeding device, the frame and the basis. Due to this the limiting plate may easily be dismounted in order to adapt the device to the feeding of bigger animals. A feeding device will often be placed in a partition wall between two pigsties. The frame parts and the feeding tube then form part of the partition wall. In this situation the barrier brackets will ensure that little pigs cannot go between the two pigsties.

In practical tests it has turned out to be advantageous for the ring to be provided with 2 to 5 gate openings at its downwardly oriented side. Feed will be deposited at the gate openings and may be taken by the piglets. In practice the feed openings have a very limited area, which is typically in the order of 2 to 5 cm$^2$.

In consideration of an adequate weight of between 0.4 and 3 kg the ring is preferably produced from iron or steel. The ring may be manufactured in one piece, e.g. by molding. The ring may alternatively be produced from several ring elements, preferably 2 symmetric halves. In such a structure it will be easy and simple to mount and dismount the ring simply by disassembling the two ring elements. The ring elements may be interconnected by a screw assembly or by means of hinged connections.

In order to prevent the ring from acting as a grinder and crushing the feed, preferably the pills, it has turned out to be advantageous for the lower edge of the ring to have a limited thickness. It is preferred, therefore, that at least the lower edge of the ring is beveled so that the thickness of the ring will be between 2 and 5 mm.

Although it has turned out to be possible to prevent blockages and clotting in the feeding tube with a loose ring, it is possible according to a preferred embodiment of the invention to let the inside of the ring be provided with projecting and upwardly oriented pins designed to project into the lower end of the feeding tube. When the piglets push the ring about, the pins will establish a movement in the feed and thereby prevent blockages and bridge formations in the lower end of the feeding tube.

If the loose ring is also used for bigger pigs, it will be advantageous if a downwardly oriented spring power acts on the ring. Such downwardly oriented spring power may be obtained by the projecting pins inside the feeding tube being in contact with a spring member. This may be provided in the form of a limiting device fastened at the upper end of the feeding device. The limiting device may be elastically compressible itself, e.g. with the use of a compression spring. Alternatively the projecting pins may be elastic so that they will have a tendency to press the ring into contact against the feeding plate. The projecting pins will preferably be crossing and be in engagement with a bracket arranged at the point where the pins cross each other.

The elastic spring power may alternatively be provided by the feeding tube being provided at its lower end with openings or a track extending in vertical direction and serving to receive the aforementioned pins or special guide pins, which are projecting from the inside of the ring into the track. In such a situation the ring will only be arranged loosely for movement in a vertical position and not for rotation around the feeding tube. In this track, between the inwardly projecting pin and the upwardly oriented point of the tracks, there may be arranged a spring member, e.g. a compression spring, which causes the ring to be pressed into compressive contact against the feeding plate.

In order to make it easy for the animals to actuate the ring and to push and lift it, the ring will preferably be produced with projecting beads, knobs or the like on its outside. The projections may also be formed in the form of graduated ring elements which make it easy for the animals to put their snouts under a recess and thus lift and push the ring. Such a form will also permit the production of the ring with a slight thickness at the lower edge of the ring.

In practice the feeding tube will ordinarily have an outer diameter of between 700 and 1500 mm, preferably about 1100 mm. In order to obtain the necessary space around the tube, which will make it possible for the feed to flow out, it has turned out to be advantageous for the ring to have an inner diameter that is between 5 and 15 mm larger than the outer diameter of the tube. The height of the used ring will be between 20 and 100 mm, preferably about 50 mm.

It will also be possible to produce the ring with a considerably larger height so that the ring may in practice be said to be tubular. With such a structure it will be possible to use a relatively large height of the feed discharge opening, which is formed between the lower end of the feeding tube and the feed plate.

BRIEF DESCRIPTION OF THE DRAWINGS

The invention will now be explained in further detail with reference to the accompanying schematic drawing, wherein.

DETAILED DESCRIPTION OF THE PREFERRED EMBODIMENTS

Figure 1:
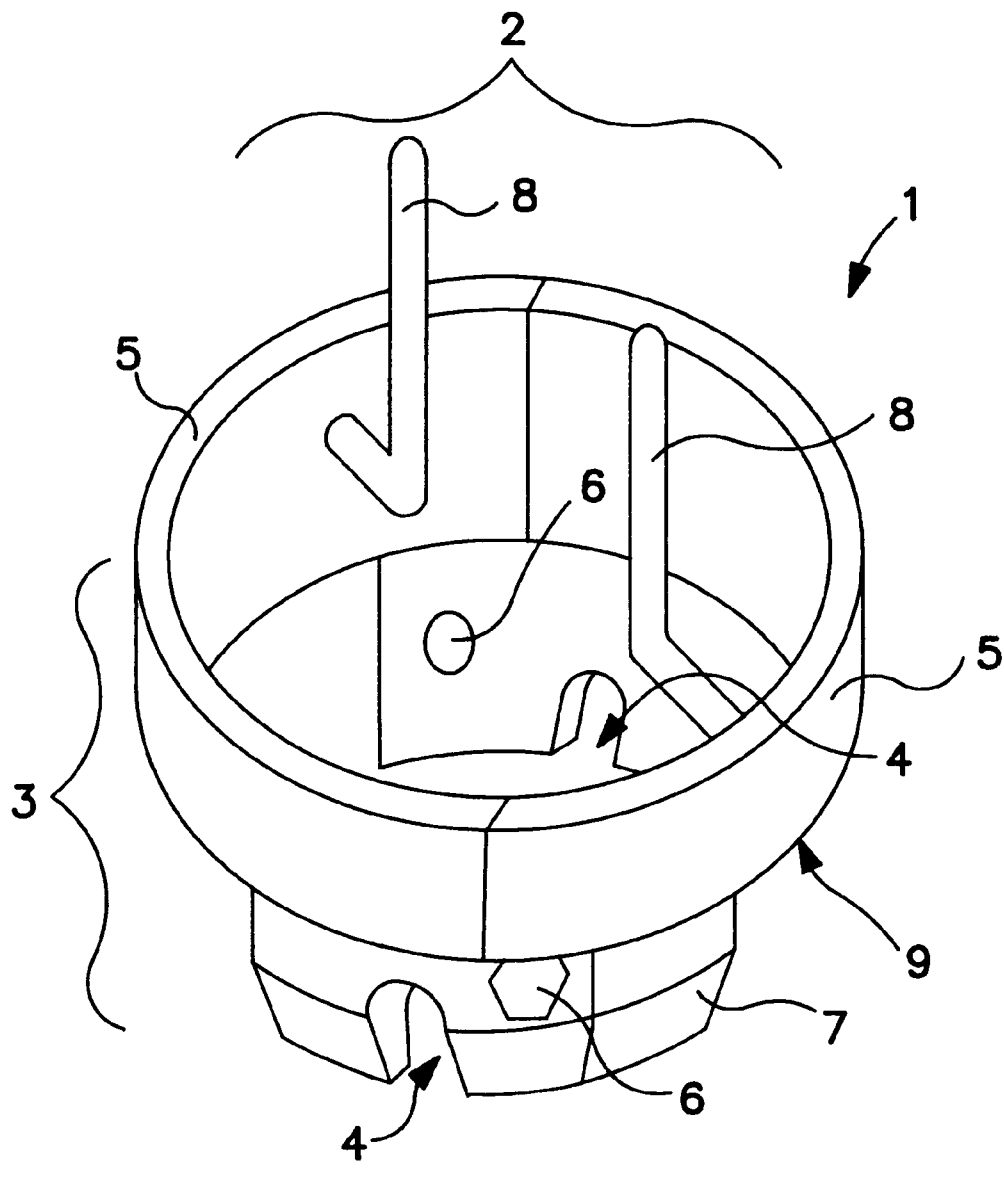
FIG. 1 shows a perspective view of a ring forming part of a feeding device according to the invention.

The ring 1 shown in FIG. 1 was produced with an inner diameter 2 that is smaller than the outer diameter of a feeding tube (discussed later with reference to FIG. 5). The ring 1 has a height 3 which is larger than the distance between a feeding plate and the lower opening of the feeding tube. At its lower edge the ring 1 is provided with two gate openings 4 which permit a small amount of feed to flow out even if the ring rests on the feeding plate.

The ring 1 is produced from two symmetric ring halves 5. The two ring halves 5 are interconnected by means of nuts 6, which make it easy to mount and dismount the ring 1 around the feeding tube.

At its lower edge area the ring has a bevel 7 so that the thickness of the lower edge is between 2 and 5 mm.

Mounted at the inside of the ring are pins 8, which are inwardly and upwardly projecting so that they are able project into the lower end of the feeding tube. As a result, feed is discharged in the feeding tube when the pigs move the ring 1.

In the embodiment shown the pin 8 is positioned at the upper side of the ring 1. Alternatively the pins may be fastened near the lower edge area of the ring 1. A position at the lower edge area makes it possible to place the feeding tube very close to the feeding plate in order to limit the height of the provided feed discharge opening. As an alternative to the two pins 8 shown, there may be used several pins, and there may also be used pins that are oriented obliquely inwardly and upwardly in the ring, and which cross each other. If the pins cross each other, they may be interconnected by a limiting device in the form of a bar, which extends upwardly through the feeding tube and which may be adjusted at the upper side of the bar where it is fastened to a fixed structure. Thus, it will be possible to press the ring 1 against the feeding plate with more or less force. This is particularly advantageous if the weight of the ring (and thus the power of gravity) does not yield sufficient closing effect. This may be the case e.g. in the feeding of bigger pigs.

In order to facilitate the manipulation with the ring 1 by the pigs, the ring 1 has a projecting edge 9 between a lower and an upper ring section. As an alternative to the edge 9 there may be used beads, knobs or the like, with which the animals may easily bring their snouts into engagement.

Figure 2:
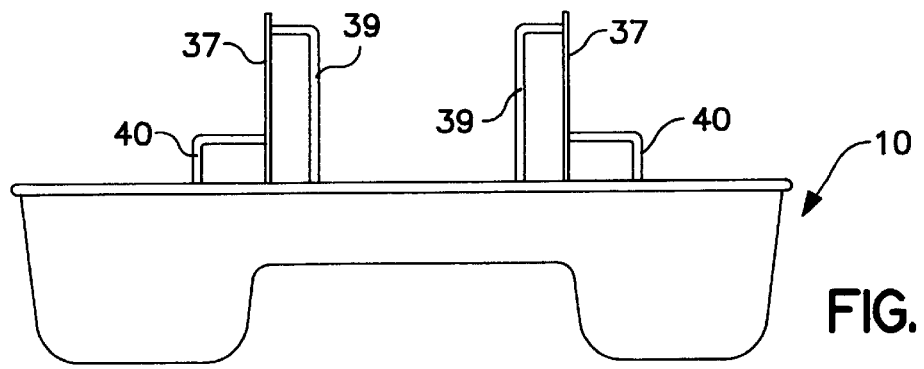
FIGS. 2–4 show a side view, a plane view and a perspective view of a trough unit having a limiting plate for use in a feeding device according to the invention, FIG. 5 a perspective view of a feeding device according to the invention.
Figure 3:
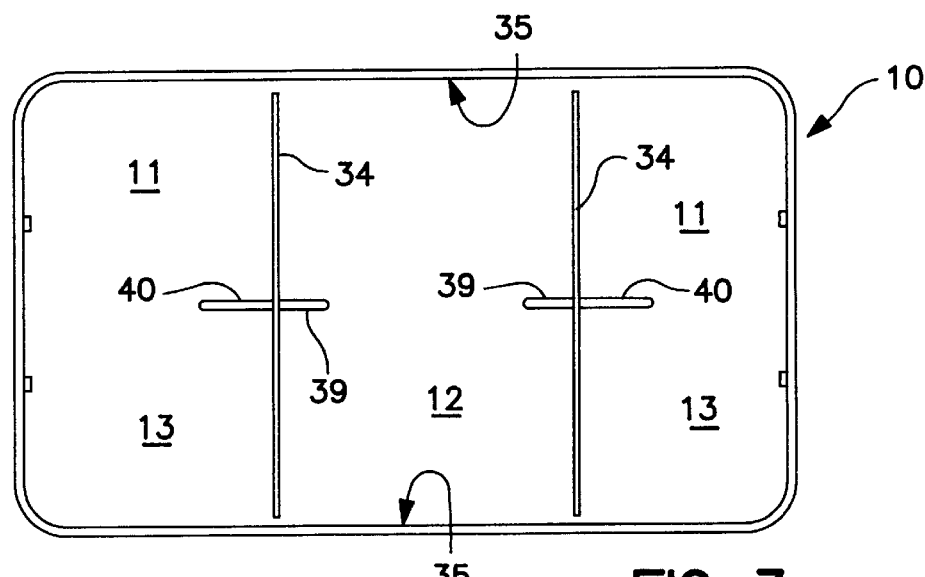
Figure 4:
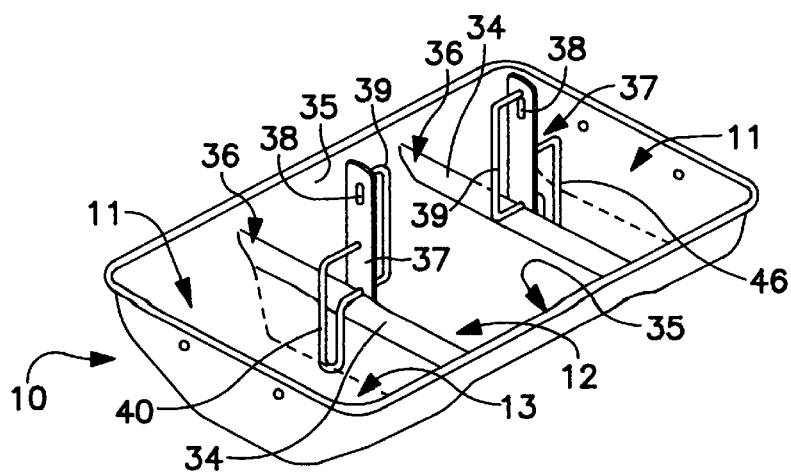
Figure 5:
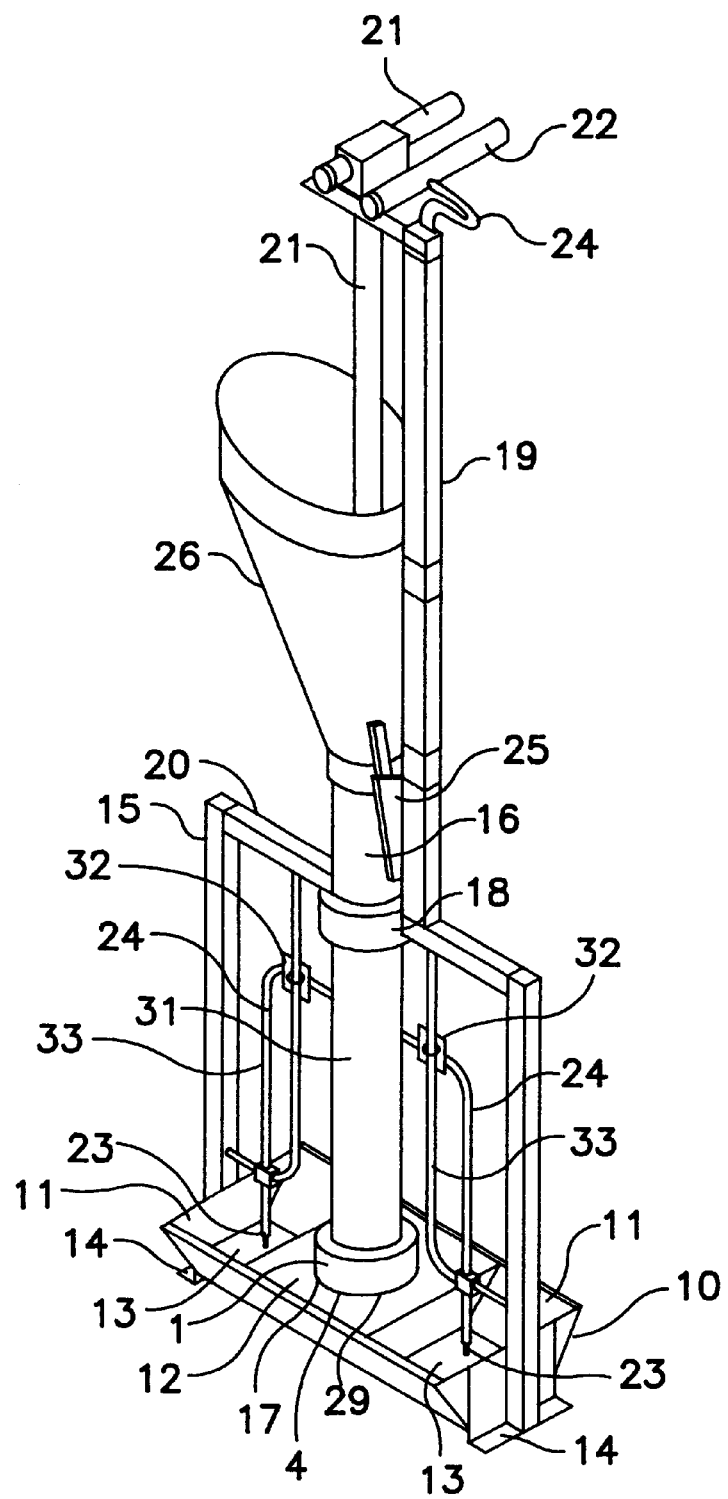
Figure 6:
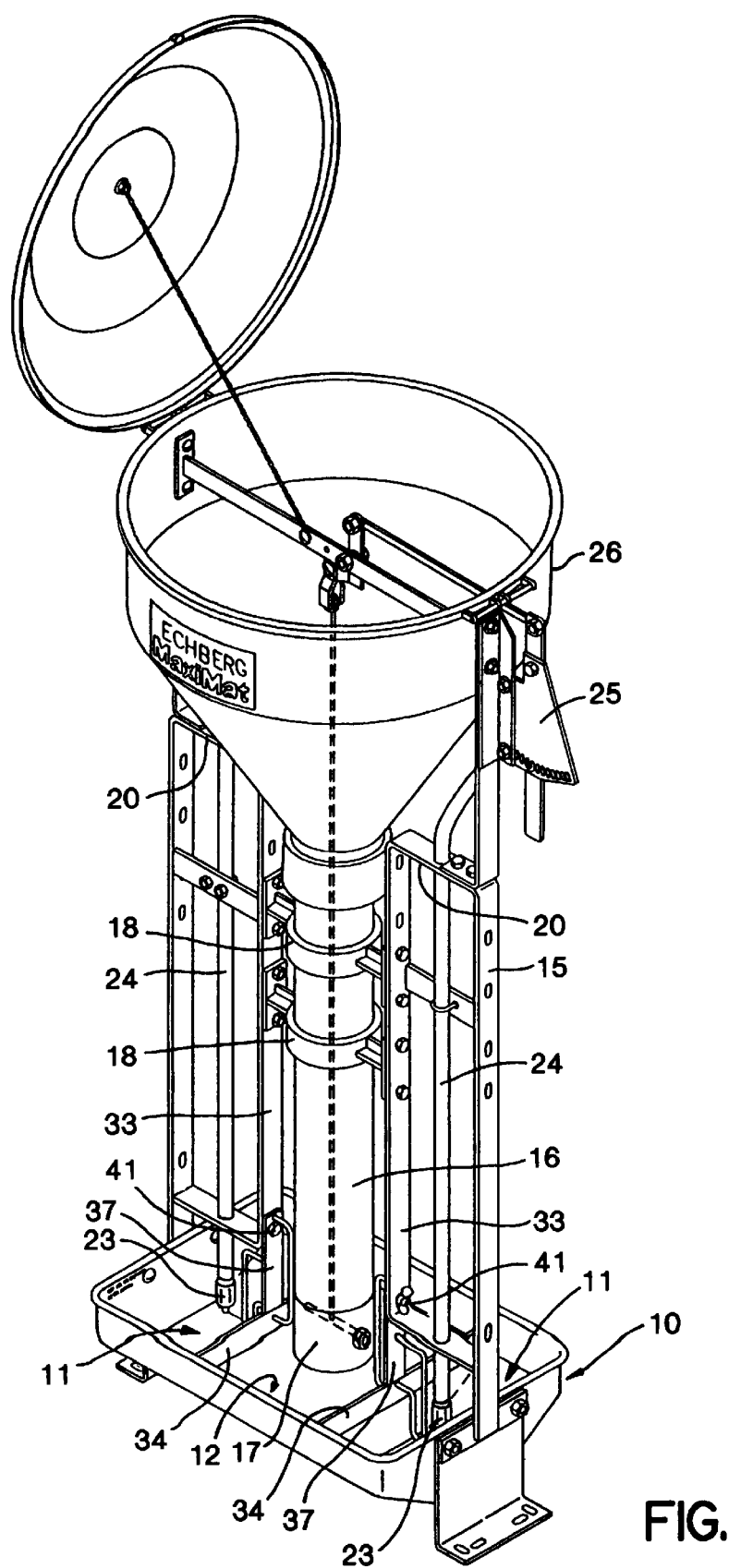
FIG. 6 is a perspective view of a second embodiment of a feeding device according to the invention.

In FIGS. 2–4 a trough unit 10 is shown, which is part of a feeding device of the type shown in FIG. 6. The feeding device shown in FIG. 6 corresponds to the one shown in FIG. 5 and, therefore, only a description of one model will be given. The trough unit 10 comprises a pair of troughs 11 arranged on either side of an elevated section, which forms an upper substantially horizontally extending feeding plate 12, which is positioned at a higher level than the bottom surfaces 13 of the troughs 11. The trough unit 10 will be connected with a mounting bracket 14 and a frame 15 such as shown in FIG. 5.

In FIGS. 2–4 a trough unit is shown having two limiting plates 34, which extend transversely of the trough unit 10 between two opposite lateral walls 35, which extend upwardly from the feeding plate 12. The plates 34 have end sections 36 with a shape corresponding to the shape of the lateral walls so that feed flowing out onto the feeding plate 12 cannot flow beyond the area delimited by the lateral walls 35 and the plates 34.

Each of the plates 34 is fastened releasably to the bracket 33 of the frame by means of a connecting plate 37, which extends upwardly and which has at its upper end an opening 38, which cooperates with a dismountable fitting 41. The plates 34 and 37 are produced from stainless steel and are welded together or alternatively produced in one piece. On either side of a connecting plate there are formed barrier brackets 39, 40, which extend toward the vertical tube 16 of the feeding device, respectively towards the frame 15. In this manner spaces are covered so that the piglets are unable to pass beyond the feeding device.

Referring now to FIG. 5 a description is given of the feeding device of which the ring 1 is a part.

The feeding device comprises a trough unit 10, which is identical with the trough unit 10 shown in FIGS. 2 to 4 and is manufactured from a metal plate, e.g. stainless steel. A mounting bracket 14 is arranged at either end of the trough unit 10, and the frame 15, which is also fastened to the trough unit 10, extends upward from the trough unit 10 and transversely of the troughs 11 substantially along a symmetry plane of the trough unit 10.

A vertically extending tube 16, which is manufactured from an elastically yielding or flexible material, such as a transparent plastic material, e.g. polyvinyl chloride, is suspended at its upper end by means of the frame 15 in such a manner that it is able to move like a pendulum. The lower edge 17 of the tube 16 is arranged at a short distance over the feeding plate 12. The tube 16 is brought through an annular part 18 mounted on the frame 15. The annular part 18 encircles the tube 16 with a radial clearance allowance permitting a limited swinging movement of the tube 16.

The upper part of the tube 16 extends along a post member 19, which is fastened to and extends vertically upwardly from an upper rail 20 in the frame 15. A feed discharge tube 21 opens into a feed reservoir 26, which is connected to the feeding tube 16. A liquid supply tube 22 is connected with a water or liquid nipple 23 arranged in each of the troughs 11 via connecting tubes 24, which extend through the post member 19 and the upper rail 20 of the frame 15. The connecting tubes 24 are connected by fittings 32 to a metal bracket 33, which constitutes part of the frame 15.

A spacing adjusting mechanism 25 interconnecting the upper end of the tube 16 and a stationary structural member is used for adjusting the spacing between the lower edge 17 of the tube 16 and the feeding plate 12.

The feeding device is designed to be used as pant of a partition wall separating two compartments or pigsties. When the feeding device is not in operation, the lower edge 17 of the tube 16 may be brought into contact with the feeding plate 12 by means of the spacing mechanism 25. As a result no feed 29 will be available to the animals in the pigsties. When the feeding device is in use, the spacing is adjusted to a suitable value by means of the spacing mechanism 25.

Through the adjustment the lower end 17 of the feeding tube 16 will be placed at a height over the feeding plate 12 that is adequate for the feed to run out and be placed in contact with the inside of the ring 1. In practice this means that the feeding tube 16 is placed at a larger distance over the feeding plate 12 than would be the case when the feeding device is used for feeding bigger pigs without using the ring 1.

In the embodiment shown the lower part 31 of the feeding tube 16 is elastically yielding so that the feeding device may also be used for feeding bigger pigs. The ring 1 is arranged around the lower part of the feeding tube 16 and is resting on the feeding plate 12.

We claim:

1. A feeding device for use in feeding animals, which comprises:

a base unit which includes a substantially rectangular feeding plate, opposite first and second lateral walls which extend upwardly from opposite lateral sides of said feeding plate, and first and second limiting plates which extend between said opposite first and second lateral walls and upwardly from said feeding plate, said limiting plates having ends which conform to inner surfaces said first and second lateral walls, a frame connected to said base unit to extend upwardly therefrom, said frame mounting a feed tube which extends downwardly to a lower end spaced above said feeding plate and between said first and second limiting plates, and a feed reservoir for delivering animal feed into an upper end of said feed tube, said first and second limiting plates having a height above said feeding plate greater than a spacing between the lower end of the feed tube and the feeding plate so that animal feed discharged from the lower end of the feed tube will not flow over said limiting plates.

2. A feeding device according to claim 1, wherein each limiting plate is fastened to a part of the frame by means of a connecting plate extending upwardly from the limiting plate.

3. A feeding device according to claim 2, wherein on either side of the connecting plate there are provided barrier brackets, which cover spaces between the feeding tube, the frame and the base.

4. A feeding device according to claim 1, wherein the limiting plates are made of stainless steel.

* * * * *